United States Patent
Mardon et al.

[15] 3,670,328
[45] June 13, 1972

[54] TUNNEL DIODE MOVEMENT DETECTOR

[72] Inventors: Austin Mardon, Santa Barbara; Robert N. Nielsen, Jr., Woodland Hills, both of Calif.

[73] Assignee: American Nucleonics Corporation, Glendale, Calif.

[22] Filed: Nov. 29, 1968

[21] Appl. No.: 785,005

[52] U.S. Cl. .................................343/8, 307/322, 331/132
[51] Int. Cl. ...........................................G01s 9/46, G01s 9/50
[58] Field of Search ..................343/7.7, 8, 175; 331/132; 307/322

[56] References Cited

UNITED STATES PATENTS

| | | | |
|---|---|---|---|
| 3,522,602 | 8/1970 | Ver Planck | 343/8 X |
| 2,826,753 | 3/1958 | Chapin | 343/8 X |
| 2,878,467 | 3/1959 | Barker et al. | 343/8 |
| 3,127,574 | 3/1964 | Sommers, Jr. | 331/132 X |
| 3,383,682 | 5/1968 | Stephens, Jr. | 343/8 X |
| 3,394,373 | 7/1968 | Makrancy | 343/8 |
| 3,443,030 | 5/1969 | Sato et al. | 307/322 X |

*Primary Examiner*—Malcolm F. Hubler
*Attorney*—John E. Wagner

[57] ABSTRACT

This disclosure involves a radar system designed primarily to give an indication whenever the relative distance between the source of electromagnetic energy and the reflecting surface changes. It is particularly adaptable for use in indicating the sink or climb rate of an aircraft alternatively in indicating the opening or closing rate as required in avoidance systems. It employs a single antenna and a single active RF element; the former constitutes simultaneously the transmitting and receiving antenna and the latter active RF element constitutes both the radio frequency energy generator for the system and the receiver down-converter for the system.

8 Claims, 5 Drawing Figures

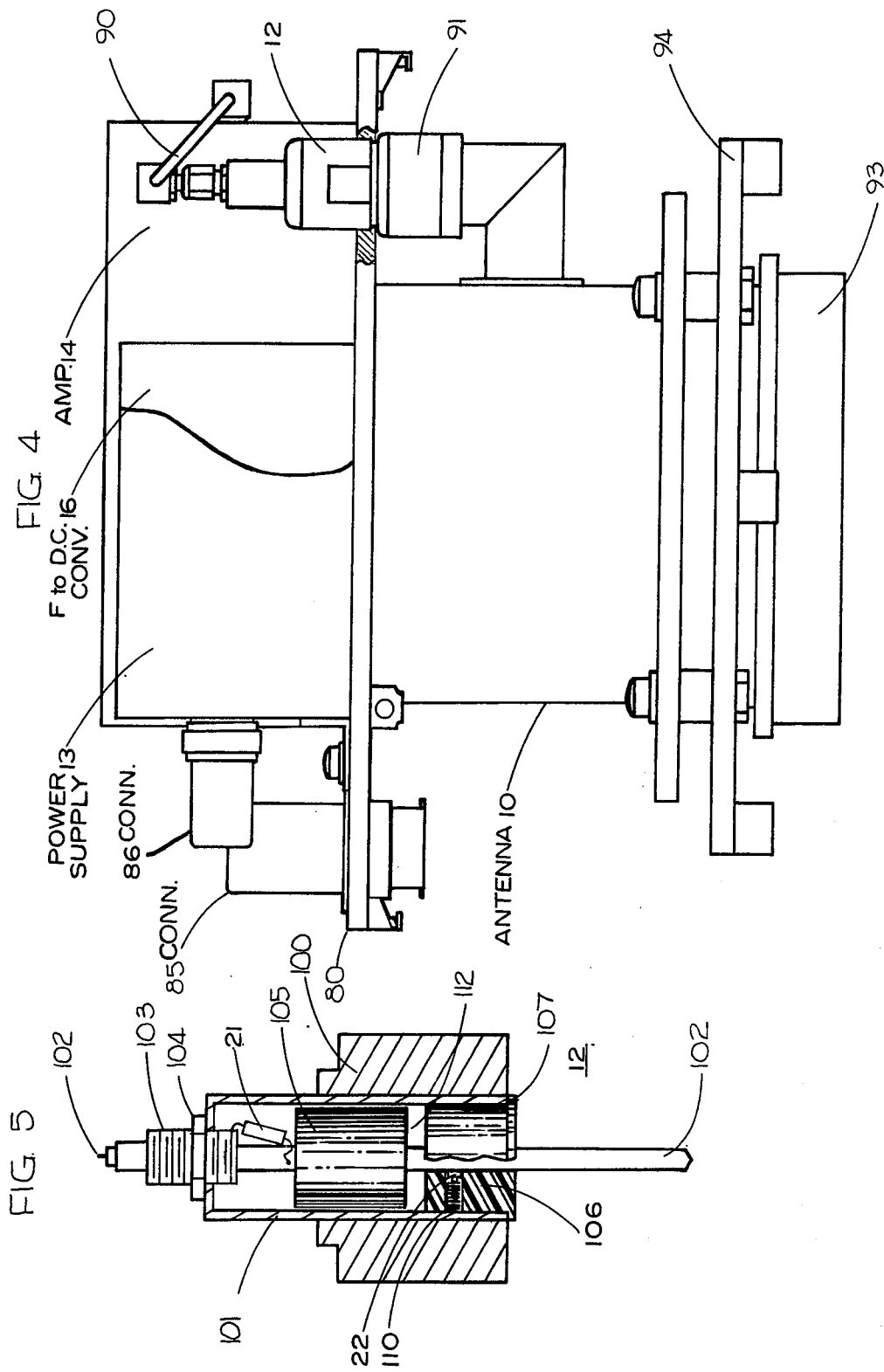

3,670,328

TUNNEL DIODE MOVEMENT DETECTOR

BACKGROUND OF THE INVENTION

Typical radar systems designed for detecting closing rate between a source of radiation and reflecting surface employ either pulse techniques or continuous wave doppler shift detection. Both of these types of systems seems to be relatively complex and each have certain advantages and disadvantages. Classically, a pulse radar provides a relatively easily distinguished signal amid background clutter and allows relatively simple time measurement between a transmitter and received pulses. Doppler radar systems tend to be relatively simpler in requirement of hardware but the detection of doppler shift and conversion to useful rate information tends to be relatively complex. Regardless of the type used, classically a single transmitter and a single receiver are used with independent antennas. Alternatively, a common antenna may be used with a directional coupler or circulator to isolate the RF transmitted signal from the received signal through any path via the reflection from a remote object.

BRIEF DESCRIPTION OF THE INVENTION

We have discovered that continuous wave or doppler radar systems can be enormously simplified by applying an inherent characteristic of certain solid state devices which are capable of operating simultaneously in two modes: namely, as microwave energy generators and as detector down converters. An example of this type of device is the tunnel diode mounted in an appropriate resonant structure. Given the proper circuit configuration and loading, the tunnel diode can be biased to provide continuous RF energy at a preselected frequency and at the same time to produce a signal which is a function of the frequency difference (Doppler shift) of the transmitted signal and the received signal. The device makes possible both the simultaneous transmission and reception of RF energy through a common antenna but also eliminates the classical TR switch or circulator of prior art radar systems.

BRIEF DESCRIPTION OF THE DRAWING

This invention may be more clearly understood by the following detailed description and by reference to the drawing in which:

FIG. 4 is a front elevational view of one physical embodyment of the invention;

FIG. 5 is a longitudinal sectional view of the source detector or oscillating detector of the system of this invention. We have a detailed description of the invention.

DETAILED DESCRIPTION OF THE INVENTION

Figure 1:
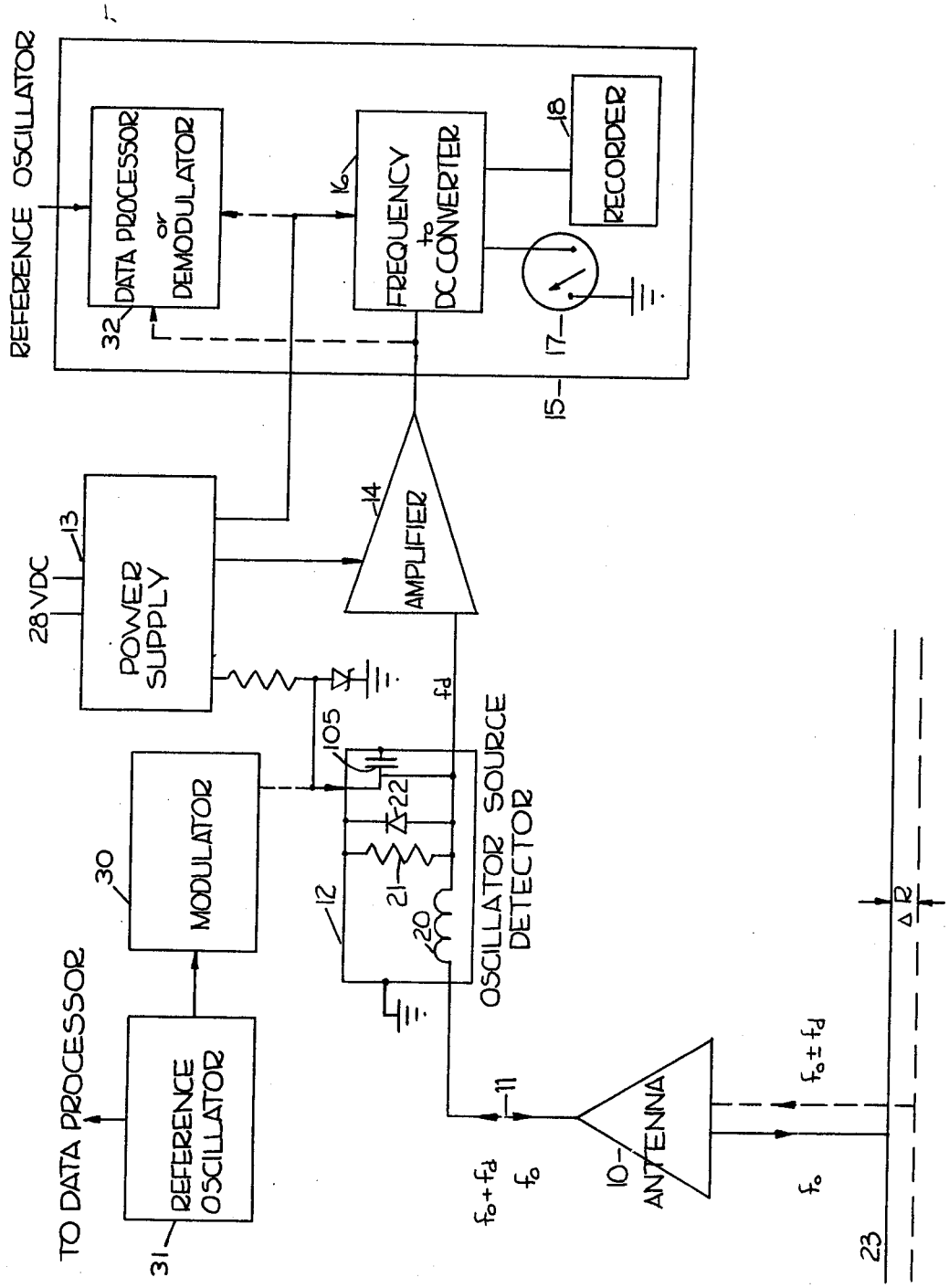
FIG. 1 is a block diagram of one embodiment of this invention.

Now referring to FIG. 1, a system of this invention is illustrated as including an antenna 10 connected by a transmission line 11 to an oscillating detector 12. The oscillating detector 12 is furnished with operating power from a power supply 13; it is additionally connected to an amplifier 14. The amplifier 14 is designed to operate at the lower or audio frequency as compared with the RF frequency generated by the system. The amplifier 14 is connected to a utilization circuit 15 which may for example include a frequency-to-DC converter 16 used to drive either a meter 17 or signal recorder 18. The amplifier 14 and utilization circuit 15 are similarly supplied with power from power supply 13.

Figure 3:
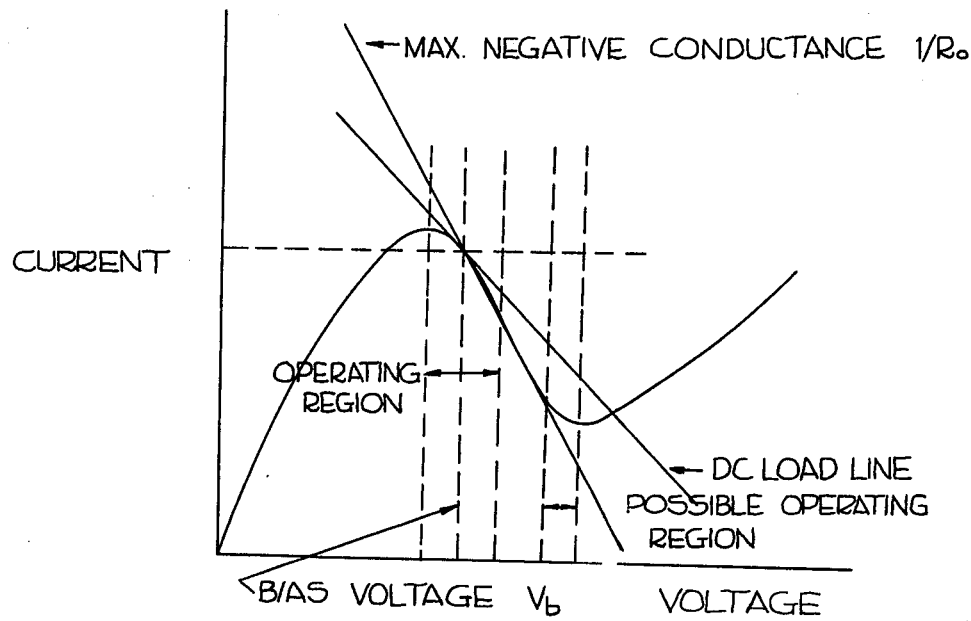
FIG. 3 is an operating characteristic diagram of the tunnel diode constituting the active RF element of this invention.

The oscillating or source detector 12 includes as critical elements a series inductance 20, a shunt resistance 21 and, most significantly, a shunt diode 22 having a negative resistance characteristic and particularly a diode of the type of known as a tunnel diode. The oscillating detector 12 when supplied with the correct bias from the power supply 13 to the diode 22 acts both as an RF generator and a mixer detector. RF energy identified for convenience as a signal $f_o$ is transmitted through the transmission line 11 to the antenna where it is radiated towards a reflecting surface for example the ground 23. If there is any relative movement between the antenna and the ground as is denoted in the drawing by the change in the distance between the ground and its previous position as $\Delta R$, the reflected energy towards the antenna is changed in frequency as represented by expression $f_o$ plus or minus $f_d$ where d denotes the Doppler shift. The equation (1) below states the relationship between the Doppler frequency $f_d$ relative velocity $v_r$ and the transmitted frequency $f_o$. The equation is:

$$f_d = (2V_r f_o/c) \qquad (1)$$

Where c is the speed of light. The received signal appears across the oscillator diode 22 which has a negative resistance characteristic as represented in FIG. 3. Biased into the negative resistance region, the non-linear characteristic of this device causes the received energy to be mixed with the generated energy and the resultant product $f_d$ is available at the output of the oscillating detector and the amplifier 14.

The system described above is designed for detection of Doppler shift. It must be recognized however that the system may additionally include a modulator as well where additional information is desired from the return signal such as range or altitude.

In FIG. 1 a modulator 30 with its reference oscillator 31 is shown as optionally connected to the system in the bias circuit. Of course using a modulated system more complex data processing is required. This is represented generally by data processor 32 of the utilization circuit 15.

Figure 2:
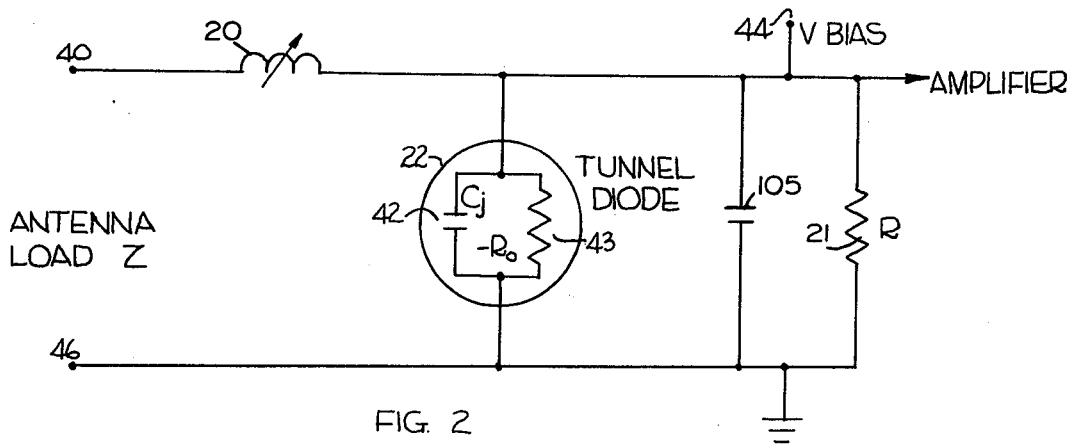
FIG. 2 is an equivalent circuit of the tunnel diode assembly of this invention.

Now referring to FIG. 2, a simplified schematic circuit for oscillating detector 12 is shown as including a pair of terminals 40 and 46 which are designed to be connected to the antenna of FIG. 1. A series inductance 20 is varied by adjusting a length of the coaxial line shown as 41 in FIG. 2 The tunnel diode 22 is shown shunting the two conductors of the oscillating detector and is represented equivalently by a junction capacitance 42 in parallel with the negative resistance 43 in the region of operation. Bias for operation of the system is supplied at terminal 44 and the tunnel diode is shunted by a resistance 21 selected to obtain maximum power transfer of the RF signal to the antenna. The demodulated signal from the tunnel diode is conducted to the amplifier as indicated to the right of the drawing.

Now referring to FIG. 3, the I-V curve of a typical tunnel diode as used in carrying out this invention is presented. The diode exhibits the classic I-V characteristic including a normal positive resistance region followed by a maximum and a negative slope region. Negative slope region is the one of interest in connection with the operation of this invention. It exhibits, near the two knees of the negative resistance portion, a non-linear operation which is selected for use. In FIG. 3, one preferred operating region is identified and the optimum operating region is identified as the bias voltage. A second possible operating region appears at the lower knee of the curve.

Now referring to FIG. 4, the physical layout of a system may be seen as including a base plate 80 upon which the electronic package is mounted including a power supply 13 a frequency-to-DC converter 16, and an amplifier package 14 and the oscillating detector 12, all of which is contained in a housing not shown in the drawing. Power supply and signal leads enter the electronic package through an external connector 85 and are distributed to and from the electronic packages through individual connectors, one of which, 86, appears in the drawing. The source detector 12 extending through the base plate 80 includes at its upper end a coaxial cable assembly 90 terminating at its opposite end at the input amplifier 14. A coaxial connector 91 from the lower end of the oscillating detector 12 extends below the base plate 80 and mates with a circular horn antenna 92 extending below the base plate and constituting the single antenna of the system. Antenna 10 is terminated in a radome 93 and is mounted on an epoxy ring 94 to attach the entire system to the skin or the frame of an aircraft while thermally isolating the system from the aircraft. Most of the foregoing description is provided to illustrate a desirable physical packaging of the system of this invention. Needless to say the physical arrangements of the elements can be changed but the fundamental characteristic is that the oscillating detector 12 is positioned to couple RF energy to the antenna 10 and audio energy to the amplifier 14.

Now refer to FIG. 5 which constitutes a sectional view of the oscillating detector 12. It comprises basically a body member 100 including a threaded portion at one end for mating with a coaxial connector such as connector 91 of FIG. 4 and including a central opening into which the outer conductive sleeve 101 of the coaxial system is positioned in a sliding fit relationship. The sleeve 101 of the body 100 are insulated from a center conductor 102. Sleeve threads engaging an enlarged threaded portion 103 allow movement of sleeve 101 relative to the center conductor 102. A lock nut 104 secures the relative longitudinal position of the sleeve 101. The center conductor 102 includes an enlarged cylindrical conductive slug 105 which acts as an RF bypass between the center conductor 102 and the shell 101. Spaced from the slug 105 along the shaft 102 is a dielectric sleeve 106 with an outer lip 107 engaging the end of the sleeve 101. The sleeve 106 includes a transverse opening 110 in which the tunnel diode 22 is positioned and maintained by spring pressure against the center conductor 102. The spacing between the diode 22 and the adjacent face 112 of the slug 105 is adjustable by moving the sleeve and center conductor 102 with respect to each other. The upper end of the center conductor 102 constitutes the mating portion for the coaxial cable assembly 90 of FIG. 4, while the lower end of the center conductor 102 mates with the center conductor of the connector 91 of FIG. 4. Shunt resistance 21 is illustrated connected between the center conductor 102 and the outer sleeve 101.

The foregoing is representative of illustrative embodiments of this invention and is not to be construed as limiting. It is recognized that one skilled in the art can produce additional structures differing in appearance or circuit details while falling within the spirit and scope of the invention. Therefore the true scope of the invention is defined by the following claims.

We claim:

1. A radar system comprising:
   an antenna;
   an oscillating detector connected to said antenna;
   said oscillating detector including transmission line means connected to said antenna and a tunnel diode connected in shunt across said transmission line;
   power supply means for biasing the tunnel diode of said oscillating detector into a negative resistance and rectifying region of its operating characteristic;
   said oscillating detector resonating into the said antenna which provides a load whereby the combination constitutes a source of electromagnetic radiation;
   said oscillating detector responsive to incident energy at the antenna to produce the demodulated product of the mixing of the radiated and incident energy.

2. The combination in accordance with claim 1 wherein said transmission line comprises a series impedance element between the antenna and the said tunnel diode, said transmission line exhibiting inductive characteristic which is resonated with the inherent junction capacitance of the tunnel diode.

3. The combination in accordance with claim 2 wherein said system includes means for applying modulation to the oscillating detector.

4. A doppler radar system comprising an antenna for radiating and receiving electromagnetic energy;
   an oscillating detector connected to said antenna;
   power supply means for biasing said oscillating detector into a non linear negative resistance region for simultaneous oscillation and detection;
   means for amplifying any difference in frequency detected by said oscillating detector; and
   means for representing said difference frequency as a function of the Doppler shift in the radiated and received electromagnetic energy;
   said oscillating detector comprising a length of RF transmission line connected to said antenna;
   a tunnel diode connected in shunt across said transmission line at a distance from said antenna wherein the inherent junction capacitance of said tunnel diode resonates with the inductance of said transmission line at a pre-determined selected frequency.

5. The combination in accordance with claim 4 wherein said tunnel diode which has a negative resistance and rectifying region and said power supply biases said diode into said region whereby the diode is capable of simultaneously oscillating at said preselected frequency and detecting difference frequencies appearing at the diode.

6. A Diode assembly comprising:
   a coaxial transmission line including a central conductor and an outer shell;
   a contact junction diode;
   conductive means mounting the diode in pressure contact between the central conductor and outer shell;
   capacitative means between the central conductor and outer shell positioned in proximity to the diode;
   the region of the transmission line between the diode and the capacitive means constituting an inductance at the frequency of operation; and
   means for moving the diode and capacitance longitudinally on the central conductor relative to each other to tune the oscillating detector.

7. A coaxial diode assembly comprising:
   a central conductor;
   an outer shell;
   a dielectric sleeve on said central conductor in sliding fit therewith;
   a transverse opening in the sleeve;
   diode means positioned in the transverse opening in contact with the central conductor;
   means making electrical contact with the diode and the outer shell;
   an enlarged portion of the central conductor extending toward the outer shell; and
   means for moving the dielectric sleeve longitudinally on the central conductor to tune the diode assembly.

8. The combination in accordance with claim 7 wherein said dielectric sleeve includes an outer lip engaging an end of the outer shell and including means for advancing the shell with respect to the central conductor to move the diode.

* * * * *